United States Patent [19]
Ito

[11] Patent Number: 6,000,746
[45] Date of Patent: Dec. 14, 1999

[54] MOUNTING STRUCTURE AND MOUNTING METHOD FOR MOUNTING A WINDOW PANEL ON A WINDOW FRAME OF VEHICLE BODY

[75] Inventor: Tosikazu Ito, Obu, Japan

[73] Assignee: Tokai Kogyo Kabushiki Kaisha, Obu, Japan

[21] Appl. No.: 08/919,155

[22] Filed: Aug. 28, 1997

[30] Foreign Application Priority Data

Sep. 2, 1996 [JP] Japan ................................... 8-231914

[51] Int. Cl.$^6$ ................. B60J 1/10; B60J 1/02; B60J 10/02
[52] U.S. Cl. ................... 296/146.15; 296/96.21; 296/201
[58] Field of Search ............... 296/146.15, 93, 296/201, 96.21; 52/208, 204.7, 204.591

[56] References Cited

U.S. PATENT DOCUMENTS

| | | |
|---|---|---|
| 4,884,380 | 12/1989 | Yada et al. . |
| 4,910,071 | 3/1990 | Kunert . |
| 5,039,157 | 8/1991 | Yada ........................................ 296/93 |
| 5,057,265 | 10/1991 | Kunert et al. . |
| 5,108,526 | 4/1992 | Cornils et al. . |
| 5,273,704 | 12/1993 | Scholl et al. . |
| 5,316,829 | 5/1994 | Cordes et al. . |
| 5,336,349 | 8/1994 | Cornils et al. . |
| 5,544,458 | 8/1996 | Fisher et al. .......................... 296/93 X |
| 5,624,148 | 4/1997 | Young et al. ............................ 296/93 |
| 5,746,859 | 5/1998 | Gold ...................................... 296/201 X |

FOREIGN PATENT DOCUMENTS

| | | |
|---|---|---|
| 252729 | 9/1992 | Australia . |
| 0638408 | 2/1995 | European Pat. Off. . |
| 0707937 | 4/1996 | European Pat. Off. . |
| 0537067 | 6/1996 | European Pat. Off. . |
| 0768162 | 4/1997 | European Pat. Off. . |
| 8113031 | 7/1996 | Japan . |

*Primary Examiner*—D. Glenn Dayoan
*Assistant Examiner*—Lori L. Coletta
*Attorney, Agent, or Firm*—Dennison, Meserole, Scheiner & Schultz

[57] ABSTRACT

A mounting structure for mounting a window panel on a window frame of a vehicle body including a fastener provided on the rear surface of the window panel, the fastener having a groove engageable with a flange of the window frame and having a removed section formed between opposed end surfaces thereof, and a spacer provided on the flange of the window frame and positioned to correspond to the removed section of the fastener, the spacer having opposed end surfaces which may engage the end surfaces of the fastener. The end surfaces of the spacer and the end surfaces of the fastener are preferably shaped such that the end surfaces of the spacer engage the end surfaces of the fastener to prevent the spacer from dropping out of the removed section of the fastener when the window panel is mounted on the window frame by engaging the groove of the fastener with the flange of the window frame, with the spacer received in the removed section of the fastener.

29 Claims, 10 Drawing Sheets

MOUNTING STRUCTURE AND MOUNTING METHOD FOR MOUNTING A WINDOW PANEL ON A WINDOW FRAME OF VEHICLE BODY

BACKGROUND OF THE INVENTION

1. Field of the Invention

The present invention relates to a mounting structure for mounting a window panel such as a window glass on a window frame of a vehicle body by utilizing an elongated fastener, and also relates to a mounting method for mounting the window panel on the window frame.

2. Description of the Prior Art

FIGS. 18 to 20 exemplarily shows a conventional mounting structure for mounting a window panel 111 such as a window glass on a window frame 102 of a vehicle body by utilizing an elongated fastener 113.

In the conventional mounting structure of the window panel 111, as shown in FIGS. 18 and 19, the window panel 111 is provided with the elongated fastener 113 which is extrusion molded on and adhered to the rear surface of the window panel 111 so as to extend substantially along the periphery of the window panel 111. As will be appreciated, the fastener 113 has a substantially looped configuration corresponding to an annular flange 104 formed around the window frame 102 and has a groove 116 which is dimensioned to closely receive a periphery 105 of the annular flange 104. The window panel 111 is mounted on the window frame 102 of the vehicle body by engaging the groove 116 of the fastener 113 with the periphery 105 of the annular flange 104 of the window frame 102.

As described above, the elongated fastener 113 is directly extrusion molded on the rear surface of the window panel 111. Therefore, the fastener 113 includes an unavoidable removed section which is produced by the width of an extrusion molding die through which a molding material is extruded. Such a removed section may reduce sealing performance between the window panel 111 and the window frame 102 when the window panel 111 is mounted on the window frame 102.

To obtain desired sealing performance between the window panel 111 and the window frame 102, a spacer 117 is used to close the removed section. As will be appreciated, the spacer 117 has the same cross-sectional configuration as the fastener 113 and has a groove 120 which is dimensioned to closely receive the periphery 105 of the annular flange 104. The spacer 117 is arranged in such a way that the groove 120 is aligned to the groove 116 of the fastener 113, and is affixed to the rear surface of the window panel 111 with an adhesive.

The window panel 111 with the fastener 113 and the spacer 117 is mounted on the window frame 102 by engaging the groove 116 of the fastener 113 and the groove 120 of the spacer 117 with the periphery 105 of the annular flange 104.

In general, to facilitate mounting the window panel 111 to the window frame 102, as shown in FIG. 20, a string 130 is temporarily introduced in the grooves 116 and 120 to broaden the grooves 116 and 120. Thereafter, the window panel 111 is fitted to the window frame 102 by engaging the broadened grooves 116 and 120 with the periphery 105 of the annular flange 104. When the grooves 116 and 120 completely engage the periphery 105 of the annular flange 104, the string 130 is removed from the grooves 116 and 120 so that the grooves 116 and 120 are restored to their normal shape. Thus, the window panel 111 is mounted on the window frame 102.

However, in the conventional mounting structure of the window panel 111, unless the spacer 117 is sufficiently adhered to the window panel 111, the spacer 117 is accidentally dropped out of the window panel 111 when the groove 120 thereof is broadened by the string 130. Therefore, to prevent the spacer 117 from dropping out of the window panel 111, the spacer 117 has to be firmly adhered to the rear surface of the window panel 111. This may require much time for attaching the spacer 117 to the window panel 111, thereby increasing labor for mounting the window panel 111 on the window frame 102.

Moreover, in the conventional mounting structure, the spacer 117 may deviate from or drop out of the removed section of the fastener 113 in use if it is not sufficiently adhered to the window panel 111. This may cause reduction of sealing performance between the window panel 111 and the window frame 102.

Such a mounting structure for mounting a window panel on a window frame of a vehicle body is disclosed, for example, in Japanese Laid-Open Patent Publication No. 8-113031.

SUMMARY OF THE INVENTION

It is, accordingly, an object of the present invention to provide a mounting structure and a mounting method for mounting a window panel on a window frame of a vehicle body in which a spacer need not be adhered to the window panel to reduce labor for mounting the window panel on the window frame.

In order to attain the object, the present invention provides a mounting structure for mounting a window panel on a window frame of a vehicle body including a fastener provided on the rear surface of the window panel, the fastener having a groove engageable with a flange of the window frame and having a removed section formed between opposed end surfaces thereof, and a spacer provided on the flange of the window frame and positioned to correspond to the removed section of the fastener, the spacer having opposed end surfaces which may engage the end surfaces of the fastener. The end surfaces of the spacer and the end surfaces of the fastener are preferably shaped such that the end surfaces of the spacer engage the end surfaces of the fastener to prevent the spacer from dropping out of the removed section of the fastener when the window panel is mounted on the window frame by engaging the groove of the fastener with the flange of the window frame, with the spacer received in the removed section of the fastener.

According to the present structure, it is not necessary to adhere the spacer to the fastener. This may lead to reduction of labor for mounting the window panel on the window frame. Further, the spacer can be reliably retained on the fastener. This may ensure sealing performance between the window panel and the window frame.

Other objects and features of the invention will be more fully understood from the following detailed description and appended claims when taken with the accompanying drawings.

DETAILED DESCRIPTION OF THE PREFERRED EMBODIMENT

A mounting structure and a mounting method according to a first embodiment of the present invention will now be described with reference to FIGS. 1 to 9.

Figure 2:
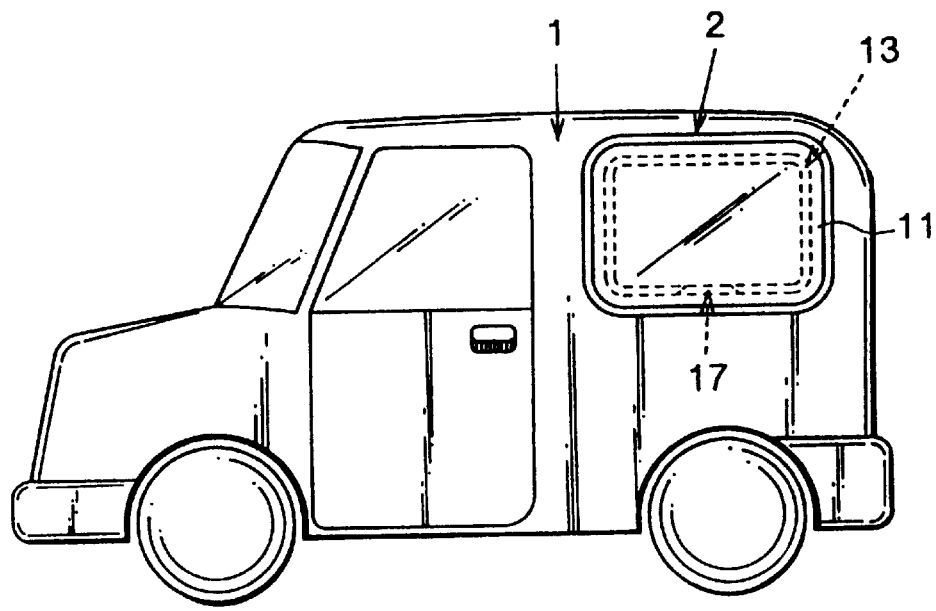
FIG. 2 is a side view of the vehicle body on which the window panel is mounted by utilizing the mounting structure.

Referring to FIG. 2, shown therein and generally designated by the reference number 1 is a vehicle body integrally having a window frame 2 to which a window panel 11 made of glass, transparent resin or other materials is mounted.

Figure 4:
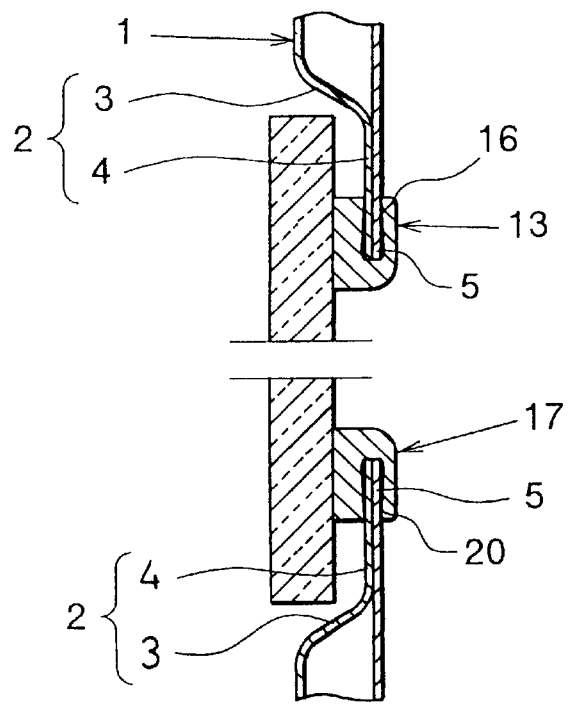
FIG. 4 is a sectional view taken along the line IV—IV of FIG. 3.

As shown in FIG. 4, the window frame 2 includes an annular flange 4 inwardly projected therefrom and an annular receiving wall 3 extending therealong.

Figure 1:
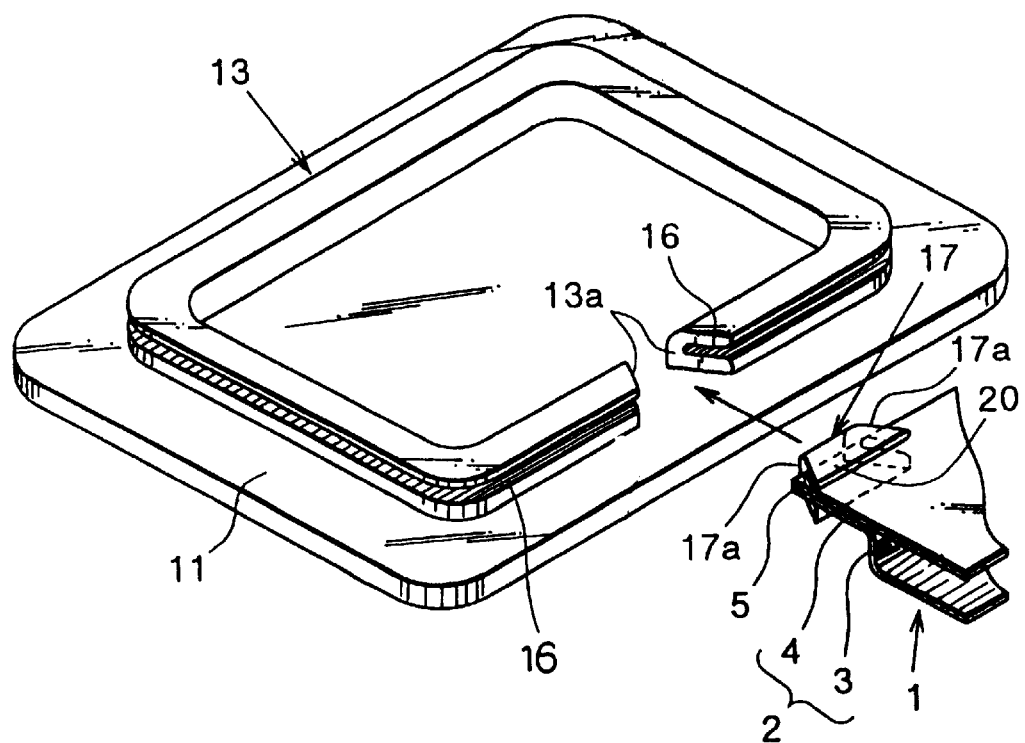
FIG. 1 is a perspective view of a window panel and a window frame of a vehicle body showing a mounting structure according to a first embodiment of the present invention.
Figure 3:
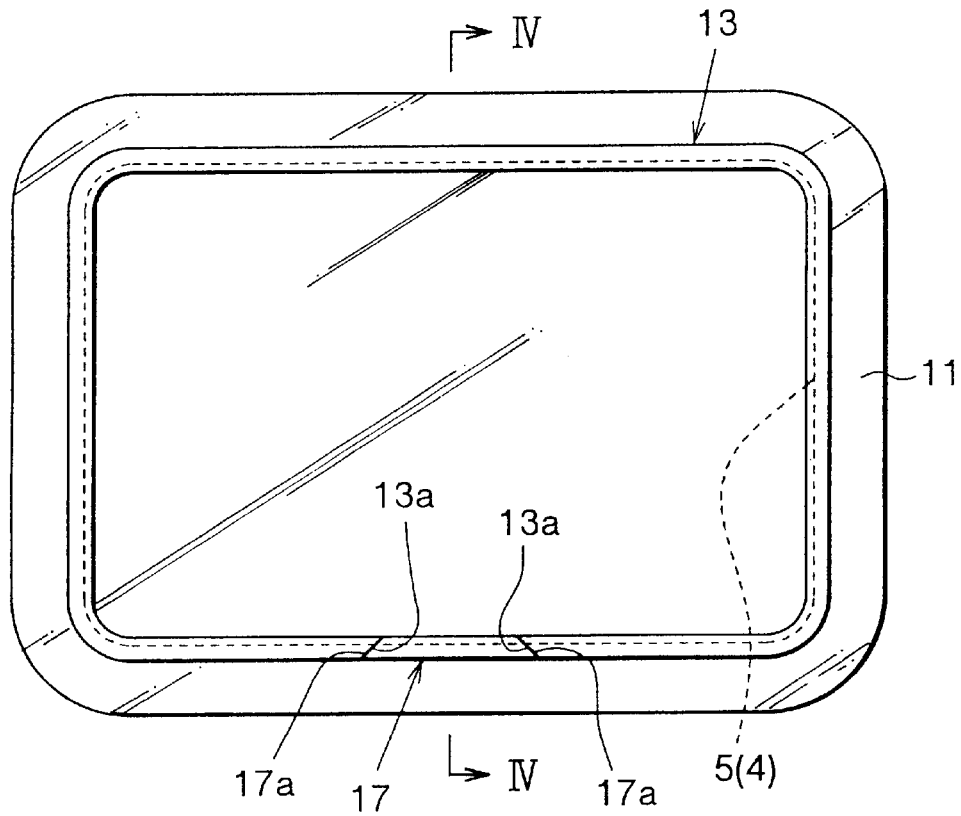
FIG. 3 is a rear view of the window panel mounted on a window frame of the vehicle body in which the window frame is omitted.
Figure 7:
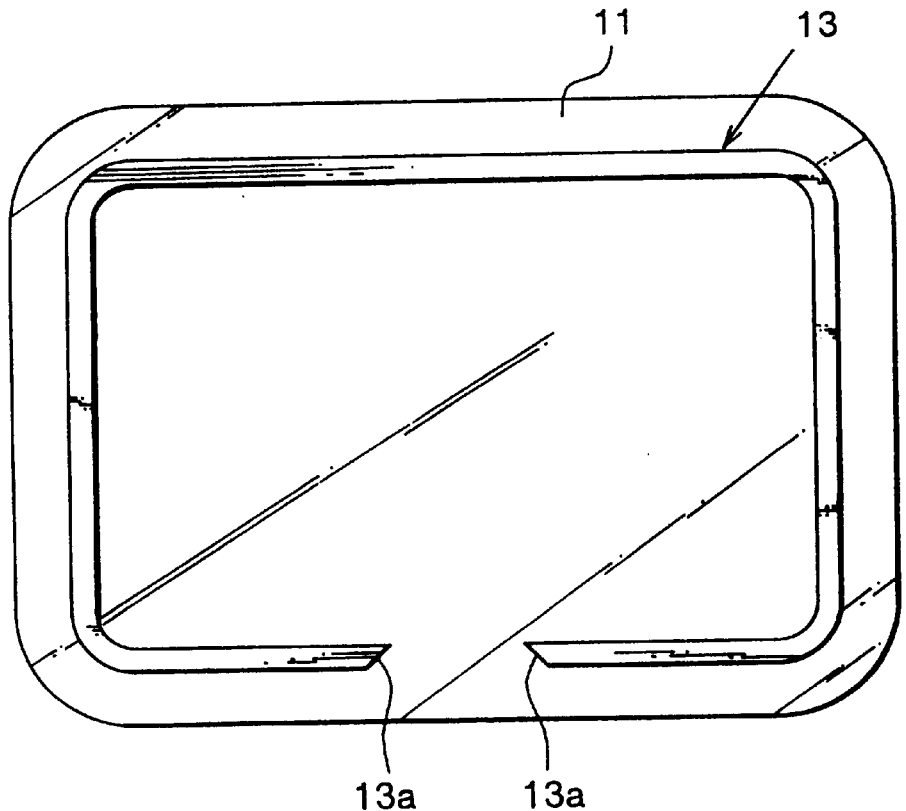
FIG. 7 is a rear view of the window panel before it is mounted on the window frame.

The window panel 11 is dimensioned to be received in the annular receiving wall 3. As shown in FIGS. 1, 3 and 4, the window panel 11 has an elongated fastener 13 provided on the rear surface thereof and having a pair of opposed end surfaces 13a. The fastener 13 is continuously formed by extrusion molding of an elastic material such as synthetic resin and rubber and simultaneously bonded to the rear surface of the window panel 11. The fastener 13 extends along the periphery of the window panel 11 and has a substantially looped profile corresponding to the annular flange 4 of the window frame 2. The fastener 13 includes a removed section formed between the opposed end surfaces 13a thereof and has a groove 16 extending over the entire length thereof. As best shown in FIG. 7, the opposed end surfaces 13a are formed such that the removed section corresponds to an edge of the window panel 11. Further, the opposed end surfaces 13a are shaped as inclined surfaces such that the removed section has an outwardly spread shape. As best shown in FIG. 1, the groove 16 outwardly opens and is dimensioned to closely receive a periphery 5 of the annular flange 4. Additionally, the fastener 13 has a uniform cross-sectional configuration over the entire length thereof.

Figure 5:
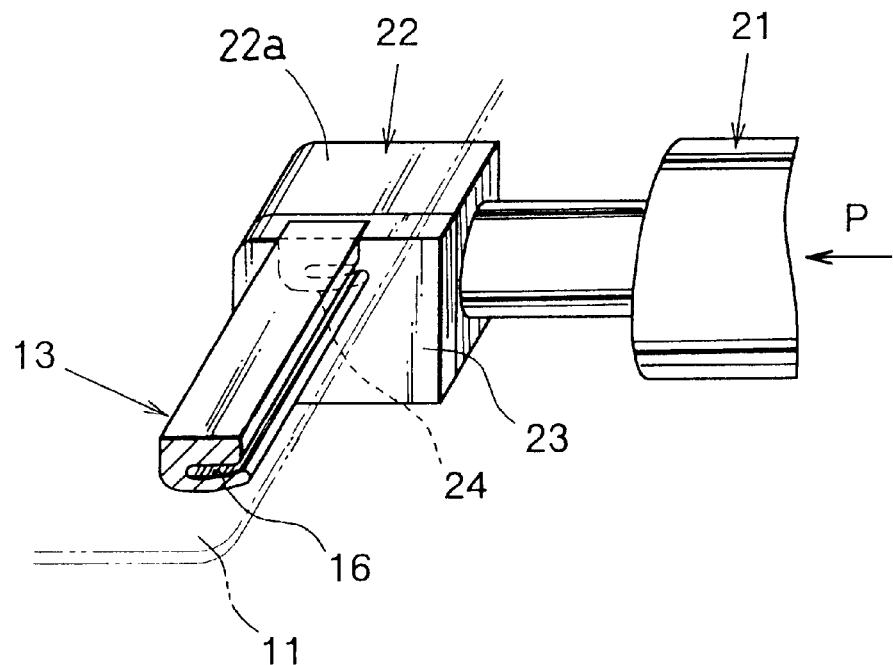
FIG. 5 is a perspective view of an extrusion molding machine which is extruding a fastener on the rear surface of the window panel.
Figure 6:
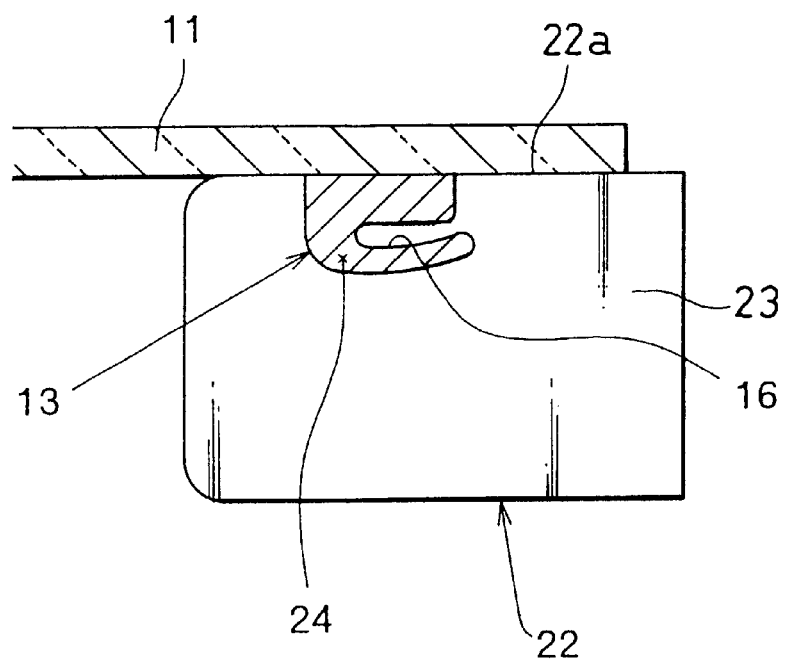
FIG. 6 is a partially elevational view of FIG. 5.

To form the fastener 13, as shown in FIGS. 5 and 7, an extrusion molding machine having a molding die 22 is used. The molding die 22 has an extrusion port 24 which communicates with an extruder 21 for extruding the elastic material P therefrom. As will be appreciated, the extrusion port 24 opens in the trailing surface 23 of the molding die 22 and has a configuration corresponding to the cross-sectional configuration of the fastener 13. Further, the extrusion port 24 partly opens in an upper contacting surface 22a of the molding die 22 so that the extruded elastic material P is reliably bonded to the rear surface of the window panel 11.

The molding die 22 is positioned under the window panel 11, with the upper contacting surface 22a thereof contacting the rear surface of the window panel 11. Thereafter, the molding die 22 and the window panel 11 are relatively moved such that the molding die 22 is moved along a predetermined orbital path on the rear surface of the window panel 11. At the same time, the elastic material P is continuously extruded from the extrusion port 24. As will be recognized, the orbital path is determined in consideration of the profile of the annular flange 4 of the window frame 2. Thus, the fastener 13 is continuously formed on and simultaneously bonded to the rear surface of the window panel 11.

Figure 8:
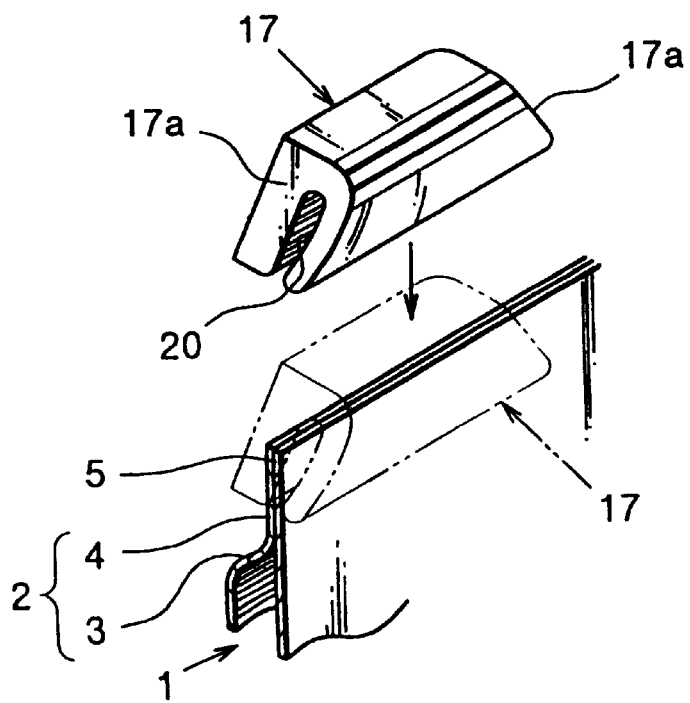
FIG. 8 is a view showing a relation between the window panel and a spacer.

On the other hand, as shown in FIGS. 1 and 8, a spacer 17 is provided on the window frame 2. The spacer 17 is positioned on the window frame 2 in a manner that it corresponds to the removed section of the fastener 13 when the window panel 11 is fitted to the window frame 2 of the vehicle body 1. As shown in FIG. 3, the spacer 17 has a shape complementary to the shape of the removed section of the fastener 13 and has opposed end surfaces 17a. Each end surface 17a is shaped as an inclined surface which may engage the end surfaces 13a of the fastener 13. Further, the spacer 17 has a groove 20 extending over the entire length thereof. The spacer 17 is attached to the window frame 2 by engaging the groove 20 with the periphery 5 of the flange 4 without using any adhesive. The spacer 17 is formed by extrusion molding or injection molding of an elastic material such as synthetic resin and rubber and has the substantially same cross-sectional configuration as the fastener 13.

The operation of mounting the window panel 11 on the window frame 2 of the vehicle body 1 will now be described.

Figure 9:
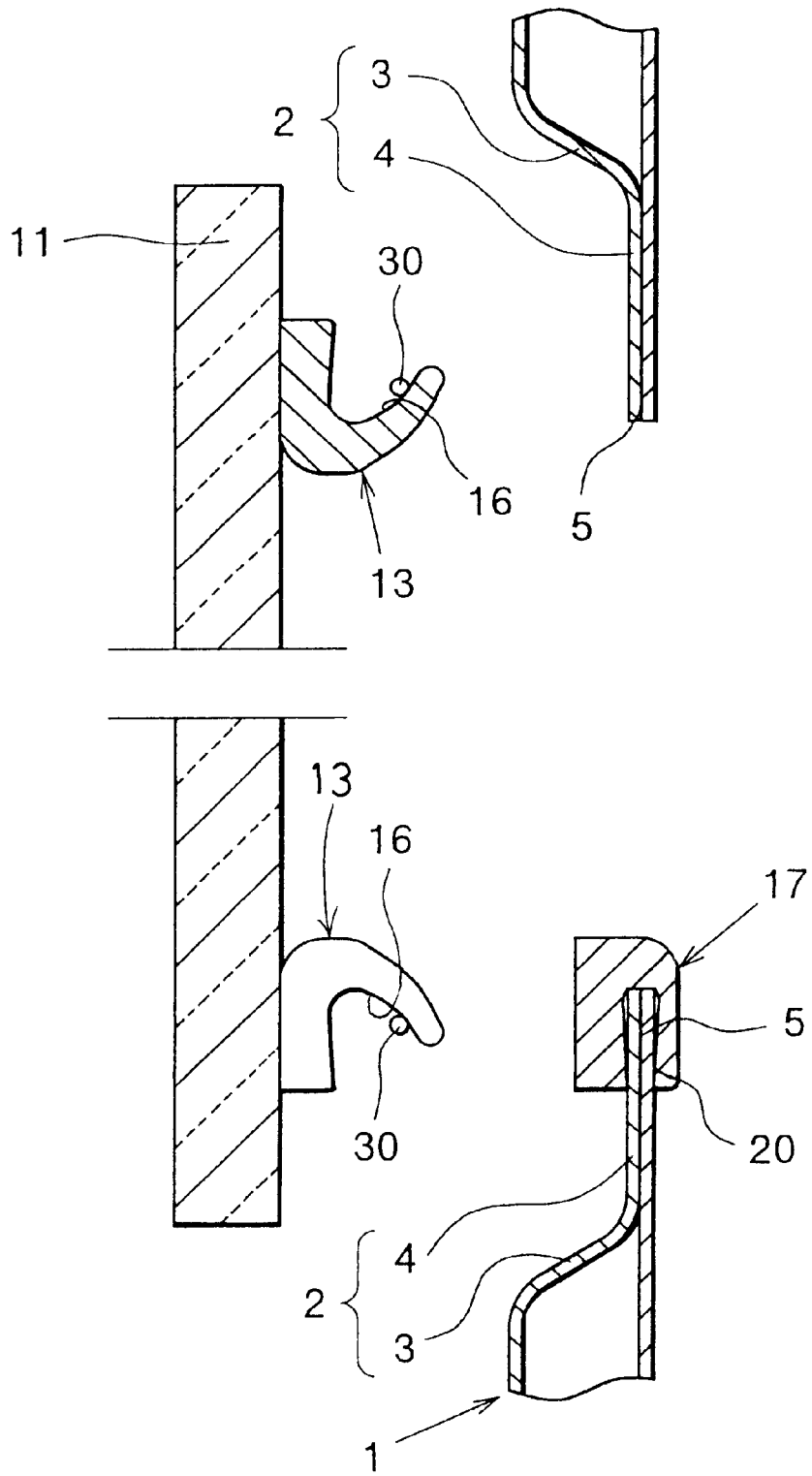
FIG. 9 is a view showing a relation between the window panel and the window frame before the window panel is mounted on the window frame.

As shown in FIG. 9, a string 30 is temporarily introduced in the groove 16 of the fastener 13 to broaden the grooves 16. Subsequently, the window panel 11 is fitted to the window frame 2 by engaging the broadened groove 16 of the fastener 13 with the periphery 5 of the flange 4. At that time, the spacer 17 attached to the periphery 5 of the flange 4 is received in the removed section of the fastener 13, so that the end surfaces 17a thereof engage the end surfaces 13a of the fastener 13. This is because the spacer 17 is preferably positioned on the periphery 5 of the flange 4 as described hereinbefore. When the groove 16 completely engages the periphery 5 of the flange 4, the string 30 is removed from the groove 16 so that the groove 16 is restored to its normal shape. Thus, the window panel 11 is mounted on the window frame 2 of the vehicle body 1.

As will be recognized, when the window panel 11 is mounted on the window frame 2 of the vehicle body 1, the spacer 17 is securely held in the removed section of the fastener 13 without deviating therefrom. This is because the end surfaces 17a of the spacer 17 and the end surfaces 13a of the fastener 13 are shaped as inclined surfaces such that the end surfaces 17a of the spacer 17 engage the end surfaces 13a of the fastener 13 to prevent the spacer 13 from dropping out of the removed section of the fastener 13 when the window panel 11 is mounted on the window frame 2.

Further, although in the present embodiment, the spacer 17 is attached to the periphery 5 of the flange 4, it can be arranged in the removed section of the fastener 13 and adhered to the rear surface of the window panel 11 by adhesive or an adhesive tape, if necessary.

Additionally, the end surfaces 13a and 17a of the fastener 13 and the spacer 17 may be preferably modified in shape.

Figure 10:
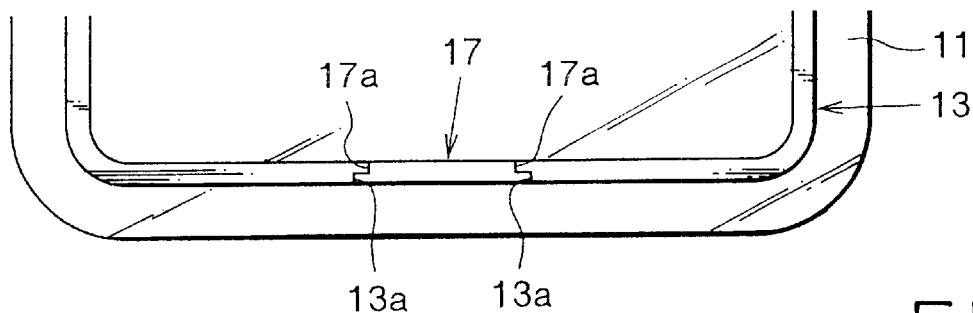
FIG. 10 is a partially rear view of the window panel mounted on the window frame of the vehicle body showing a first modified form of the fastener.

For example, in the modification shown in FIG. 10, each end surface 13a of the fastener 13 is shaped as a shoulder portion. On the other hand, each end surface 17a of the spacer 17 is shaped as a corresponding shoulder portion which may engage the shoulder portion of the fastener 13.

Figure 11:
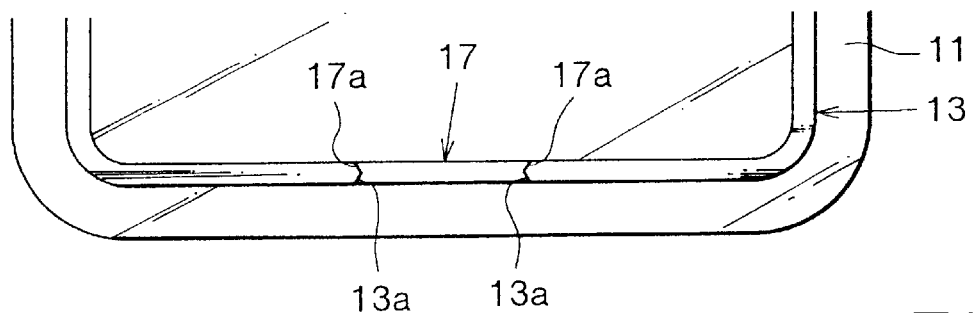
FIG. 11 is a partially rear view of the window panel mounted on the window frame of the vehicle body showing a second modified form of the fastener.

In the modification shown in FIG. 11, each end surface 13a of the fastener 13 is shaped as a V-shaped convex surface. On the other hand, each end surface 17a of the spacer 17 is shaped as a corresponding V-shaped concave surface which may engage the V-shaped convex surface of the fastener 13.

Figure 12:
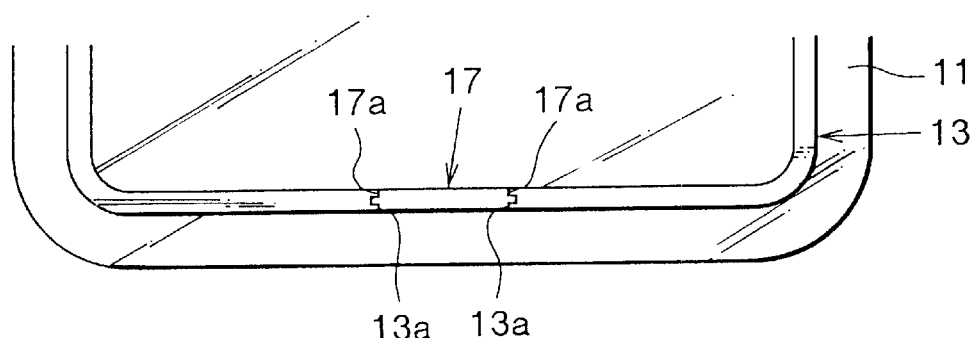
FIG. 12 is a partially rear view of the window panel mounted on the window frame of the vehicle body showing a third modified form of the fastener.

In the modification shown in FIG. 12, each end surface 13a of the fastener 13 is shaped with a mortise. On the other hand, each end surface 17a of the spacer 17 is formed with a corresponding tenon which may engage the mortise of the fastener 13.

Figure 13:
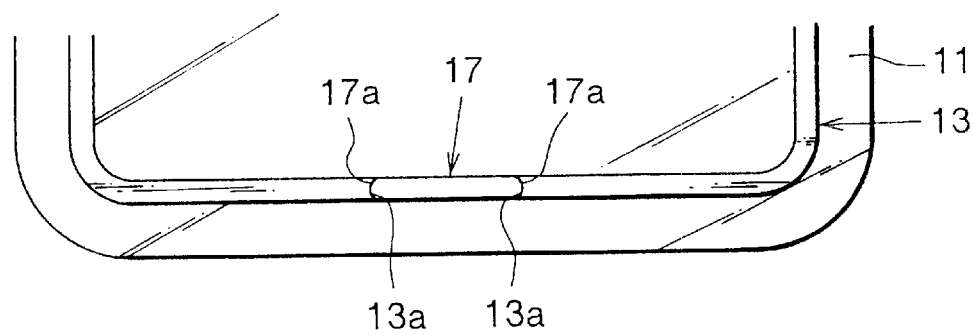
FIG. 13 is a partially rear view of the window panel mounted on the window frame of the vehicle body showing a fourth modified form of the fastener.

Also, in the modification shown In FIG. 13, each end surface 13a of the fastener 13 is shaped as a rounded concave surface. On the other hand, each end surface 17a of the spacer 17 is shaped as a corresponding rounded convex surface which may engage the rounded concave surface of the fastener 13.

A mounting structure and a mounting method according to a second embodiment of the present invention will now be described with reference to FIGS. 14 to 17.

Figure 15:
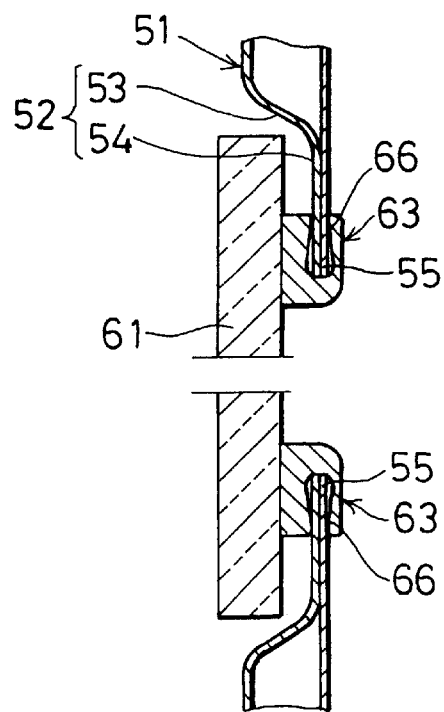
FIG. 15 is a sectional view taken along the line XV—XV of FIG. 14.

As shown in FIG. 15, a window frame 52 of a vehicle body 51 includes an annular flange 54 inwardly projected therefrom and an annular receiving wall 53 extending therealong. It is to be noted, however, that unlike the first embodiment, the window frame 52 has a substantially rectangular shape, that is, each corner section of the window frame 52 is preferably not rounded.

Figure 16:
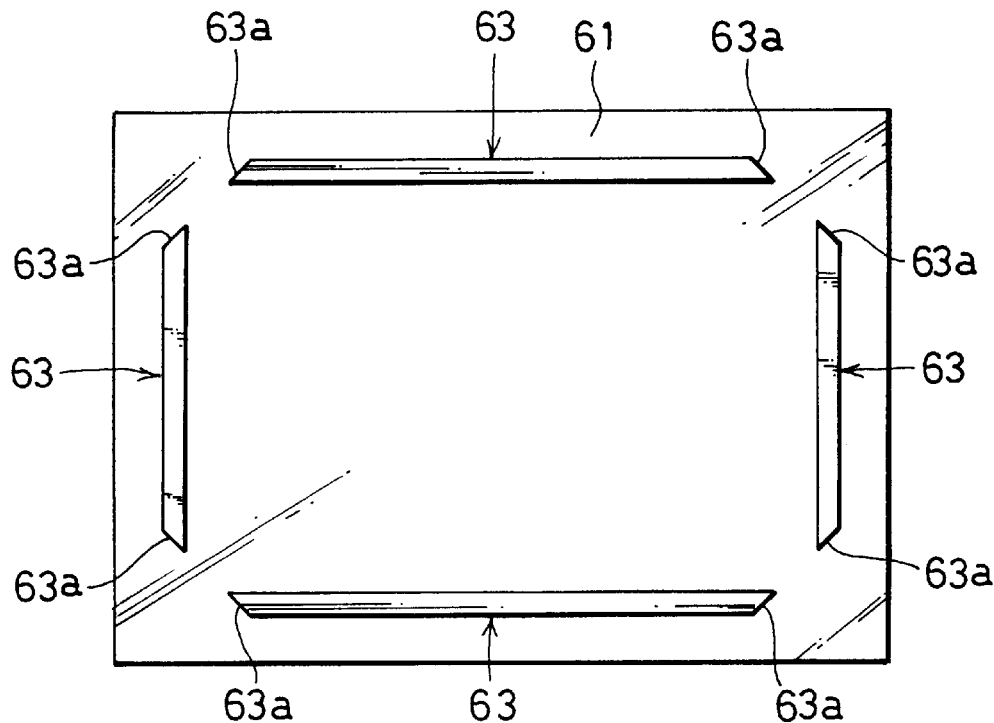
FIG. 16 is a rear view of the window panel before it is mounted on the window panel.

A window panel 61 to be mounted on the window frame 52 has a rectangular shape corresponding to the window frame 52 and is dimensioned to be received in the annular receiving wall 53. As best shown in FIG. 16, the window panel 61 has a discontinuous elongated fastener 63 provided on the rear surface thereof and having four pairs of opposed end surfaces 63a. The fastener 63 extends along four edges of the window panel 61 and has a profile corresponding to four edges of the annular flange 54 of the window frame 52. The fastener 63 includes four removed sections which are formed between the four pairs of opposed end surfaces 63a and which correspond to the four corner sections of the window panel 61. Each pair of opposed end surfaces 63a are shaped as inclined surfaces such that the removed section has an outwardly spread shape. Further, the fastener 63 has a groove 66 extending over the entire length thereof. As shown in FIG. 15, the groove 66 outwardly opens and is dimensioned to closely receive a periphery 55 of the annular flange 54. Additionally, the fastener 63 has a uniform cross-sectional configuration over the entire length thereof.

The fastener 63 is formed by extrusion molding of an elastic material such as synthetic resin and rubber and simultaneously bonded to the rear surface of the window panel 61.

Figure 14:
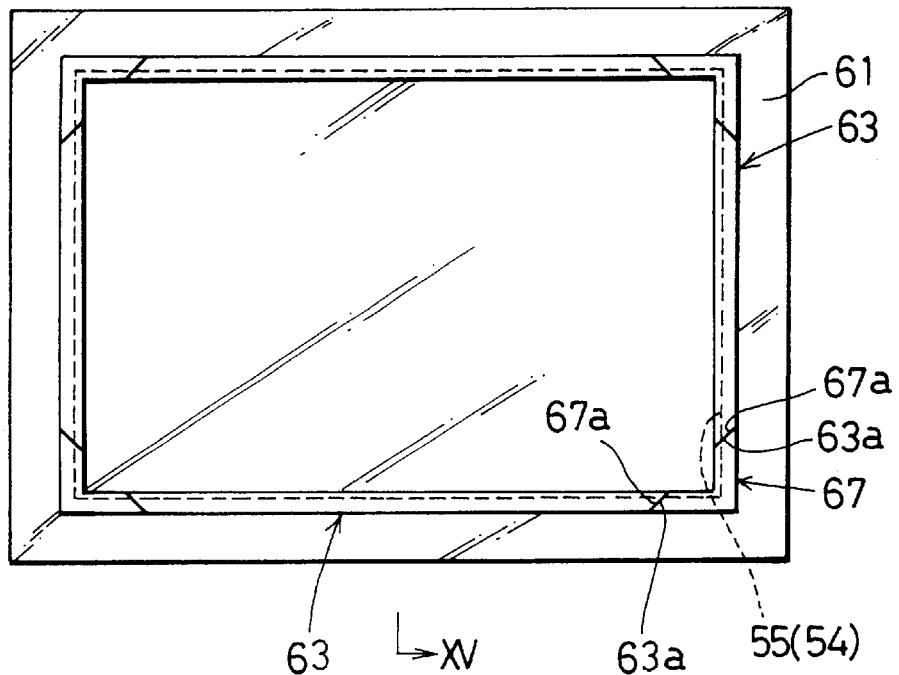
FIG. 14 is a rear view of a window panel mounted on a window frame of a vehicle body in which the window frame is omitted, showing a mounting structure according to a second embodiment of the present invention.
Figure 17:
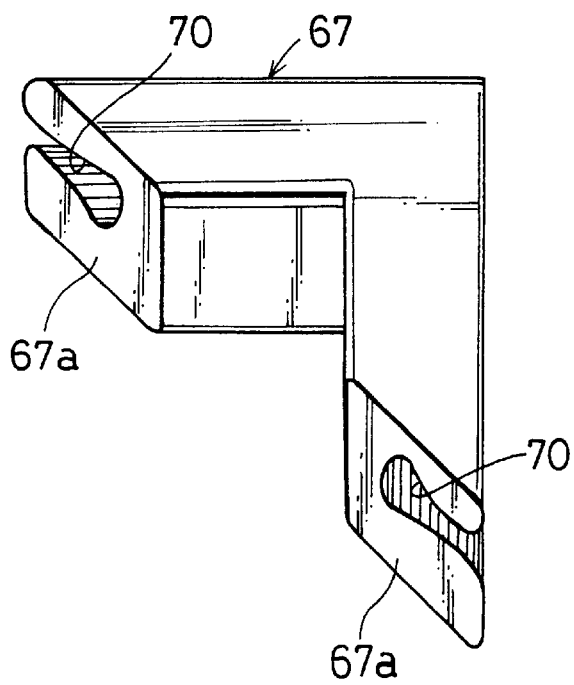
FIG. 17 is a perspective view of a spacer.
Figure 18:
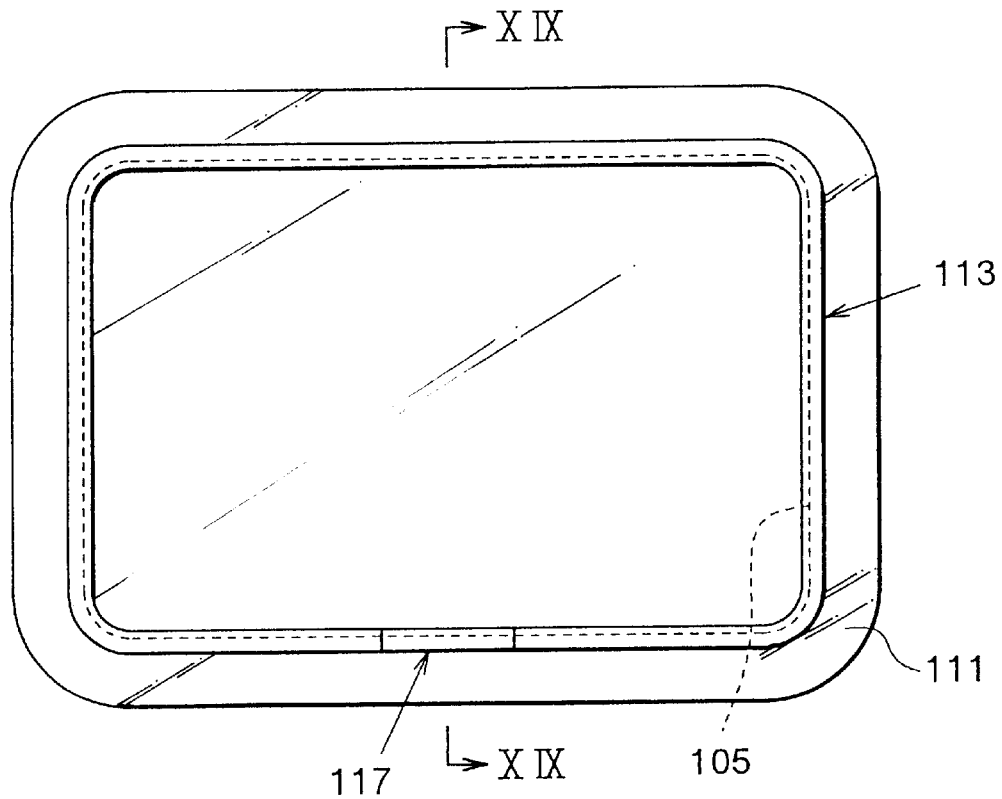
FIG. 18 is a rear view of a window panel mounted on a window frame of a vehicle body in which the window frame is omitted, showing a conventional mounting structure.
Figure 19:
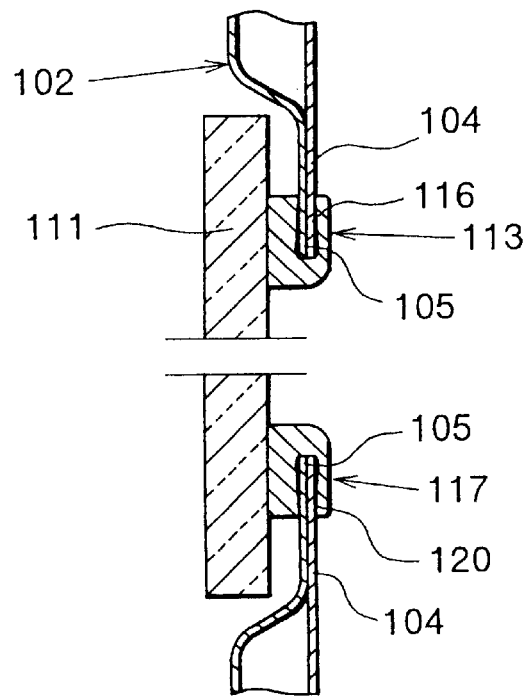
FIG. 19 is a sectional view taken along the line XIX—XIX of FIG. 18.
Figure 20:
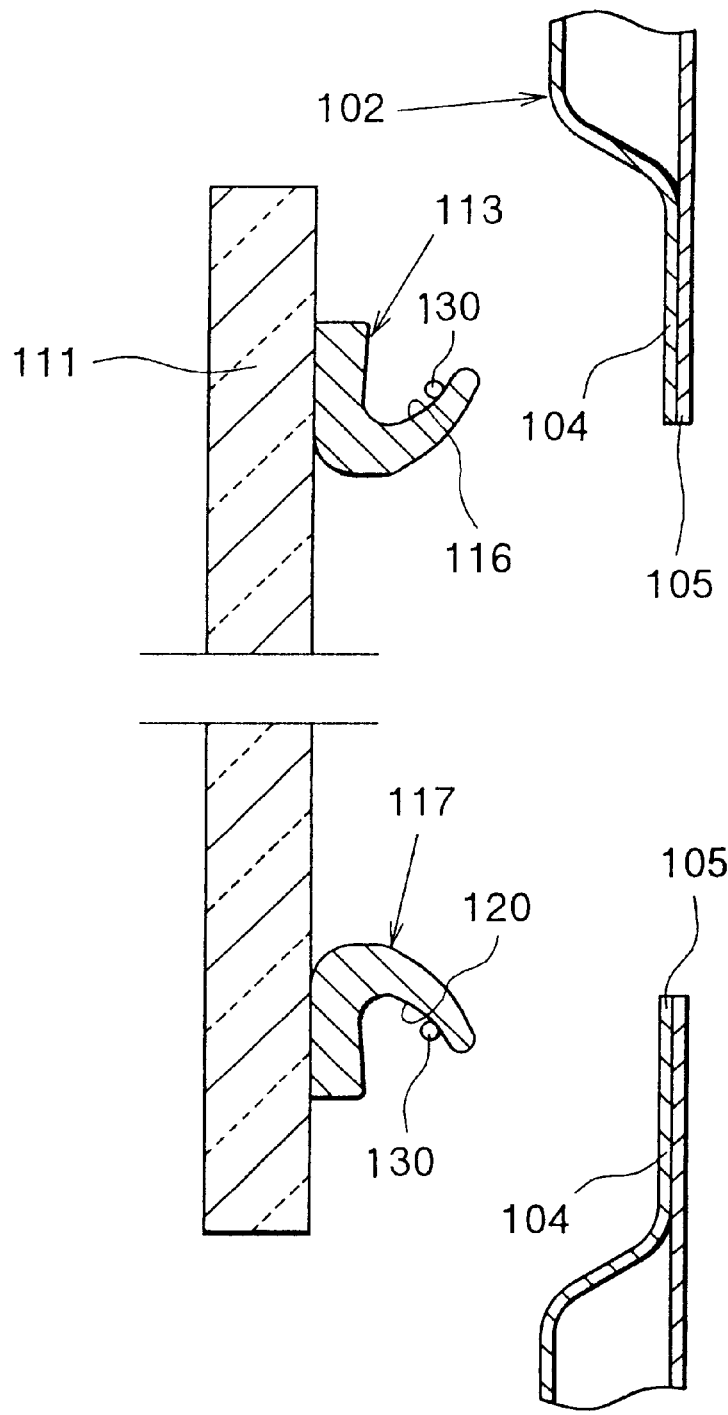
FIG. 20 is a view showing a relation between the window panel and the window frame before the window panel is mounted on the window frame.

On the other hand, four spacers 67 are provided on the window frame 52. The spacers 67 are arranged on the corner sections of the window frame 52. As shown in FIGS. 14 and 17, each spacer 67 is an L-shaped member having end surfaces 67a which may engage the adjacent end surfaces 63a of the fastener 63. Further, each spacer 67 has a groove 70 extending over the entire length thereof. Each spacer 67 is attached to the window frame 52 by engaging the groove 70 with the periphery 55 of the flange 54 without using adhesive. Like the spacer 17 according to the first embodiment, each spacer 67 is formed by extrusion molding or injection molding of an elastic material such as synthetic resin and rubber and has the substantially same cross-sectional configuration as the fastener 63.

The operation of mounting the window panel 61 on the window frame 52 of the vehicle body 51 is the same as that of mounting the window panel 11 on the window frame 2 of the vehicle body 1 according to the first embodiment. Therefore, the explanation thereof will be omitted.

According to the mounting structure of the present invention, the spacer need not be adhered to the rear surface of the window panel. This may eliminate labor for mounting the window panel on the window frame of the vehicle body. Further, the spacer is stably and securely held in the removed section of the fastener though it is not adhered or bonded to the rear surface of the window panel. This may increase sealing performance between the window panel and the window frame of the vehicle body, thereby increasing shielding efficiency for sound and water.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is:

1. A mounting structure for mounting a window panel on a window frame of a vehicle body, comprising:
   a fastener provided on the rear surface of the window panel, said fastener having a groove engageable with a flange of the window frame and having an omitted section formed between opposed end surfaces thereof; and
   a spacer provided on the flange of the window frame and positioned to correspond to said omitted section of said fastener, said spacer having opposed end surfaces which contact said end surfaces of said fastener;

said end surfaces of said spacer and said end surfaces of said fastener having complementary shapes that prevent said spacer from moving inwardly with respect to the window panel omitted section of said fastener.

2. The mounting structure as defined in claim 1, wherein said fastener is formed and simultaneously bonded to the rear surface of the window panel by extrusion molding.

3. The mounting structure as defined in claim 2, wherein said spacer is formed by extrusion molding or injection molding and is attached to the flange of the window frame.

4. The mounting structure as defined in claim 1, wherein each of said opposed end surfaces of said fastener is shaped as an inclined surface, and wherein each of said end surfaces of said spacer is shaped as an inclined surface which may engage said inclined surface of said fastener.

5. The mounting structure as defined in claim 1, wherein each of said opposed end surfaces of said fastener is formed with a shoulder portion, and wherein each of said end surfaces of said spacer is formed with a shoulder portion which may engage said shoulder portion of said fastener.

6. The mounting structure as defined in claim 1, wherein each of said opposed end surfaces of said fastener is shaped as a V-shaped convex surface, and wherein each of said end surfaces of said spacer is shaped as a V-shaped concave surface which may engage said V-shaped convex surface of said fastener.

7. The mounting structure as defined in claim 1, wherein each of said opposed end surfaces of said fastener is shaped as a rounded concave surface, and wherein each of said end surfaces of said spacer is shaped as a rounded convex surface which may engage said rounded concave surface of said fastener.

8. The mounting structure as defined in claim 1, wherein each of said opposed end surfaces of said fastener is formed with a mortise, and wherein each of said end surfaces of said spacer is formed with a tenon which may engage said mortise of said fastener.

9. The mounting structure as defined in claim 1, wherein said removed section corresponds to an edge of the window panel.

10. The mounting structure as defined in claim 1, wherein said removed section corresponds to a corner of the window panel.

11. The mounting structure as defined in claim 10, wherein said fastener includes four removed sections formed between four pairs of opposed end surfaces and corresponding to four corners of the window panel.

12. A method for mounting a window panel on a window frame of a vehicle body, comprising the steps of:
   providing a fastener on the rear surface of the window panel, said fastener having a groove enageable with a flange of the window frame and having an omitted section formed between opposed end surfaces;
   providing a spacer on the flange of the window frame and positioning said spacer to correspond to said omitted section of said fastener, said spacer having opposed end surfaces which may engage said surfaces of said fastener; and
   mounting the window panel on the window frame by engaging said groove of said fastener with the flange of the window frame, so that said end surfaces of said spacer contact said end surfaces of said fastener,
   said end surfaces of said spacer and said end surfaces of said fastener having complementary shapes that prevent said spacer from moving inwardly with respect to the window panel omitted section of said fastener.

13. A vehicle, comprising:
   a window frame having a flange,
   a window panel mounted in the window frame by a mounting structure comprising:
      an elastic fastener attached to a rear surface of the window panel, the elastic fastener having a groove that is substantially complementary to the window frame flange and at least one opening in the elastic fastener wherein an elastic fastener end is formed on each side of the opening, and
      a spacer having a groove that is substantially complementary to the window frame flange and two ends, wherein the spacer ends and the elastic fastener ends are complementary and prevent the spacer from separating from the elastic fastener opposing ends during use of the vehicle.

14. A vehicle as in claim 13 wherein the elastic fastener ends and the spacer ends are complementary inclined ends.

15. A vehicle as in claim 13 wherein the elastic fastener ends and the spacer ends are complementary shoulder portions.

16. A vehicle as in claim 13 wherein the elastic fastener ends and the spacer ends are complementary V-shaped surfaces.

17. A vehicle as in claim 13 wherein the elastic fastener ends and the spacer ends are complementary mortise and tenon surfaces.

18. A vehicle as in claim 13 wherein the elastic fastener ends and the spacer ends are rounded complementary convex and concave surfaces.

19. A vehicle as in claim 13 wherein the spacer has an L-shape.

20. A vehicle as in claim 13 wherein the elastic fastener has four openings and four spacers are fitted into the four elastic openings, each of the spacers having an L-shape.

21. A method of mounting a window panel in a window frame, comprising:
   extrusion molding an elastic fastener onto a rear surface of the window panel, the elastic fastener having a groove that is substantially complementary to a flange formed in the window frame, the elastic fastener also having at least one opening with opposing ends,
   forming a spacer having a groove that is substantially complementary to the window frame flange and opposing ends, wherein the spacer opposing ends and the elastic fastener opposing ends are complementary and prevent the spacer from separating from the elastic fastener opposing ends during use of the window panel and window frame,
   positioning the spacer on the window frame flange,
   engaging the elastic fastener of the window panel on the window frame flange having the spacer positioned thereon, and
   contacting the complementary opposing ends of the elastic fastener opening and the spacer.

22. A method as in claim 21 wherein the step of engaging the elastic fastener of the window panel onto the window frame flange having the spacer positioned thereon further comprises the steps of:
   widening the elastic fastener groove,
   contacting the widened elastic fastener groove with the window frame flange, and
   restoring the widened elastic fastener groove to its normal shape.

23. A method as in claim 21 wherein the complementary opposing ends of the elastic fastener opening and the spacer are inclined ends.

24. A method as in claim 21 wherein the complementary opposing ends of the elastic fastener opening and the spacer are complementary shoulder portions.

25. A method as in claim 21 wherein the complementary opposing ends of the elastic fastener opening and the spacer are complementary V-shaped surfaces.

26. A method as in claim 21 wherein the complementary opposing ends of the elastic fastener opening and the spacer are complementary mortise and tenon surfaces.

27. A method as in clam 21 wherein the complementary opposing ends of the elastic fastener opening and the spacer are rounded complementary convex and concave surfaces.

28. A method as in claim 21 wherein the spacer has an L-shape.

29. A method as in claim 21 wherein the elastic fastener has four openings and four spacers are fitted into the four elastic openings, each of the spacers having an L-shape.

\* \* \* \* \*

UNITED STATES PATENT AND TRADEMARK OFFICE
CERTIFICATE OF CORRECTION

PATENT NO. : 6,000,746

DATED : December 14, 1999

INVENTOR(S) : Tosikazu Ito

It is certified that error appears in the above-identified patent and that said Letters Patent is hereby corrected as shown below:

Column 2, line 50, replace "removed" with --omitted--.

Column 4, line 9, change "a" to --an--.

Column 4, line 10, replace "removed" with --omitted--.

Column 4, line 13, replace "removed" with --omitted--.

Column 4, line 16, replace "removed" with --omitted--.

Column 6, line 6, replace "removed" with --omitted--.

Column 5, line 21, delete "of the removed section" and insert --or moving inwardly with respect to the omitted section--.

Signed and Sealed this

Eighteenth Day of July, 2000

*Attest:*

Q. TODD DICKINSON

*Attesting Officer*  *Director of Patents and Trademarks*

UNITED STATES PATENT AND TRADEMARK OFFICE
CERTIFICATE OF CORRECTION

PATENT NO. : 6,000,746
DATED : December 14, 1999
INVENTOR(S) : Tosikazu ITO

It is certified that error appears in the above-indentified patent and that said Letters Patent is hereby corrected as shown below:

```
Column 1, line 36, replace "removed" with --omitted--.
Column 1, line 38, replace "removed" with --omitted--.
Column 1, line 44, replace "removed" with --omitted--.
Column 2, line 16, replace "removed" with --omitted--.
Column 2, line 38, replace "removed" with --omitted--.
Column 2, line 41, replace "removed" with --omitted--.
Column 4, line 48, replace "removed" with --omitted--.
Column 4, line 51, replace "removed" with --omitted--.
Column 5, line 4,  replace "removed" with --omitted--.
Column 5, line 15, replace "removed" with --omitted--.
Column 5, line 25, replace "removed" with --omitted--.
Column 6, line 10, replace "removed" with --omitted--.
Column 7, line 39, replace "removed" with --omitted--.
Column 7, line 42, replace "removed" with --omitted--.
Column 7, line 45, replace "removed" with --omitted--.
```

UNITED STATES PATENT AND TRADEMARK OFFICE
CERTIFICATE OF CORRECTION

PATENT NO. : 6,000,746
DATED : December 14, 1999
INVENTOR(S) : Tosikazu ITO

It is certified that error appears in the above-indentified patent and that said Letters Patent is hereby corrected as shown below:

Column 2, lines 46-47, replace "of the removed section" with --or moving inwardly with respect to the omitted section--.

Column 6, lines 65-66, replace "omitted section of said fastener" with --omitted section of said fastener when assembled--.

Column 7, line 4, replace "the window panel omitted section" with --the omitted section--.

Column 7, line 67, replace "the window panel omitted section" with --the omitted section--.

Column 8, lines 8-10, replace "at least one opening in the elastic fastener wherein an elastic fastener end is formed on each side of the opening" with --at least a pair of elastic fastener ends forming an opening (an omitted section) therebetween--.

Column 8, line 42, replace "at least one opening with opposing ends" with --at least a pair of elastic fastener ends forming an opening (an omitted section) therebetween--.

Column 8, line 34, replace "openings" with --omitted sections--.

Column 8, line 35, replace "openings" with --omitted sections--.

UNITED STATES PATENT AND TRADEMARK OFFICE
CERTIFICATE OF CORRECTION

PATENT NO.   : 6,000,746
DATED        : December 14, 1999
INVENTOR(S)  : Tosikazu ITO It is certified that error appears in the above-indentified patent and that said Letters Patent is hereby corrected as shown below:

Column 8, line 66, replace "opening" with --omitted section--.

Column 9, line 2, replace "opening" with --omitted section--.

Column 9, line 5, replace "opening" with --omitted section--.

Column 9, line 8, replace "opening" with --omitted section--.

Column 10, line 2, replace "opening" with --omitted section--.

Column 10, line 7, replace "opening" with --omitted section--.

Column 10, line 8, replace "openings" with --omitted sections--.

Signed and Sealed this

Thirteenth Day of March, 2001

Attest:

NICHOLAS P. GODICI

Attesting Officer

Acting Director of the United States Patent and Trademark Office